United States Patent Office 3,558,674
Patented Jan. 26, 1971

3,558,674
6,7-METHYLENE AND 6,7-HALOMETHYLENE PREGNANES AND 19-NORPREGNANES AND PROCESSES FOR THEIR PREPARATION
Colin C. Beard, Freeport, Grand Bahama Island, and Alexander D. Cross, Mexico City, Mexico, assignors to Syntex Corporation, Panama, Panama, a corporation of Panama
No Drawing. Continuation-in-part of applications Ser. No. 486,226, Sept. 9, 1965, now Patent No. 3,338,928; Ser. No. 499,092, Oct. 20, 1965; and Ser. No. 634,411, Apr. 11, 1967, now Patent No. 3,438,977. This application Apr. 1, 1969, Ser. No. 819,512
The portion of the term of the patent subsequent to Apr. 15, 1986, has been disclaimed
Int. Cl. C07c 169/34
U.S. Cl. 260—397.4      23 Claims

ABSTRACT OF THE DISCLOSURE 6,7-methylene-, 6,7-monohalomethylene, and 6,7-dihalomethylene-3-keto-$\Delta^4$-pregnanes and 19-norpregnanes optionally containing double bond unsaturation at the C–1,2 position and/or hydrogen, methyl, chloro or fluoro at C–6, and/or methylene, methyl, chloro, fluoro, hydroxy or acyloxy at C–16, and/or hydrogen, hydroxy or acyloxy at C–17, which compounds exhibit progestational activities and processes for the preparation of such compounds.

This is a continuation-in-part of Ser. No. 634,411, filed Apr. 11, 1967 now U.S. Pat. No. 3,438,977 and Ser. No. 486,226, filed Sept. 9, 1965, now U.S. Pat. No. 3,338,928, and Ser. No. 499,092, filed Oct. 20, 1965, now abandoned.

This invention pertains to novel steroids, in particular to pregnanes and 19-norpregnanes having a cyclopropyl or halocyclopropyl ring fused to the C–6,7 position of the molecule as represented by the following skeletal steroid Formula A in which, for convenience and simplicity, only the novel grouping is depicted, the wavy line denoting and including both the alpha and beta configurations and each of X and Y being hydrogen, chloro or fluoro:

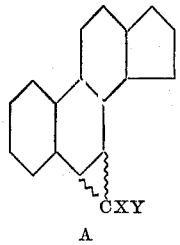

A

Specifically, this invention is directed at compounds which are diagrammatically represented by Formula I below:

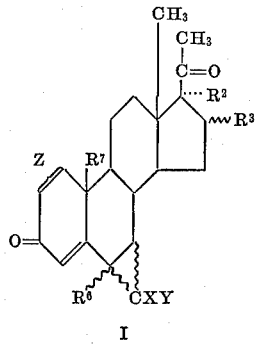

I wherein $R^2$ is hydrogen, hydroxy, or a hydrocarbon carboxylic acyloxy group of less than 12 carbon atoms;

$R^3$ is methylene, $\beta$-methyl, $\alpha$-chloro, $\alpha$-fluoro, $\alpha$-hydroxy, or an $\alpha$-hydrocarbon carboxylic acyloxy group of less than 12 carbon atoms;
$R^6$ is hydrogen, methyl, chloro or fluoro;
$R^7$ is hydrogen or methyl;
Z is a carbon-carbon single bond or a carbon-carbon double bond, Z being a single bond when $R^7$ is hydrogen; and
each of X and Y is hydrogen, chloro, or fluoro.

In the above formulas and in those which follow, the wavy line ($\int$) denotes and includes both the alpha and beta configurations.

The hydrocarbon carboxylic acyl and acyloxy groups of the present invention which are referred to in the above definitions contain less than 12 carbon atoms and can possess a straight, branched, cyclic or cyclic-aliphatic chain structure which is saturated, unsaturated, or aromatic and optionally substituted by functional groups, such as hydroxy, alkoxy containing up to 5 carbon atoms, acyloxy containing up to 12 carbon atoms, nitro, amino, halogeno, and the like. Typical conventional esters thus include acetate, propionate, enanthate, benzoate, trimethylacetate, t-butlyacetate, phenoxyacetate, cyclopentylpropionate, aminoacetate, $\beta$-chloropropionate, adamantoate, and the like.

These compounds of the present invention of Formula I are progestational agents which are useful in the control and regulation of fertility and in the management of various menstrual disorders. Such compounds also are anabolic agents and possess varying degrees of anti-androgenic, anti-estrogenic and anti-gonadotrophic activities. These compounds are administered in accordance with this activity via any of the normally employed routes including oral, parenteral, and topical administrations.

For such administrations, the compounds can be suitably formed into a pharmaceutically acceptable non-toxic composition via the incorporation of any of the usually employed excipients taking the form of powders, capsules, pellets, pills, solutions, creams, ointments, aerosols, and so forth. In addition, they can be administered in conjunction with other medicinal agents depending upon the specific condition being treated.

In administering these compounds, a convenient daily dosage regimen which can be adjusted according to the degree of affliction is employed. Most conditions respond well to treatment in the order of magnitude usually employed in the case of other compounds so used; that is, via a daily dosage unit of from 0.001 mg. to 10 mg. per kg. of body weight, the remainder being an inert vehicle or combination thereof.

A preferred class of the compounds of the present invention is represented above by Formula I wherein $R^3$ is methylene or $\beta$-methyl, each of $R^2$, $R^6$, $R^7$, Z, X and Y being as previously defined. A further preferred group of these compounds are those in which $R^3$ is methylene or $\beta$-methyl and each of X and Y is fluoro, the other groups being as previously defined. These latter compounds can be represented by Formula II

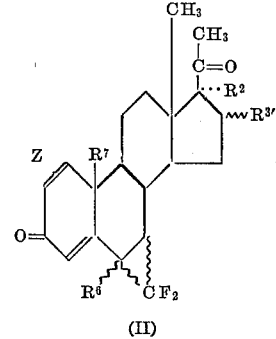

(II)

wherein each of $R^2$, $R^6$, $R^7$ and Z is as hereinbefore defined and $R^{3'}$ is methylene or β-methyl.

Further preferred are those compounds depicted by Formula II wherein $R^2$ is hydroxy or a hydrocarbon carboxylic acyloxy group, $R^{3'}$ is methylene, $R^6$ is chloro or fluoro, and $R^7$ is methyl.

The synthesis of these compounds is accomplished in a number of ways. For those compounds in which at least one of X and Y is chloro or fluoro, a 3-keto-$\Delta^{4,6}$-pregnadiene, 3-keto-19-nor-$\Delta^{4,6}$-pregnadiene or a 3-keto-$\Delta^{1,4,6}$-pregnatriene is treated with an alkali metal or alkaline earth metal salt of an acid of the formula

in which W is chloro, bromo or iodo and X and Y are as above defined, with at least one of X and Y being chloro or fluoro, such as bromochloroacetic acid, dichloroacetic acid, trichloroacetic acid, chlorofluoroacetic aid, dichlorofluoroacetic acid, chlorodifluoroacetic acid, and the like, The process is conducted at a temperature above that at which the salt decomposes, as evidenced by the evolution of carbon dioxide, and in the presence of an inert anhydrous polar organic solvent, such as dimethyl diethylene glycol ether, dimethoxyethane, dimethyl triethylene glycol ether, and the like. In practice, it is also desirable to protect hydroxy groups through the utilization of derivatives which are easily convertible to hydroxy groups, such as esters and tetrahydropyranyl ethers. This preference is not an absolute necessity; however, for while free hydroxy groups will often become involved in side reactions under the conditions of the process, they can be readily regenerated by execution of a mild alkaline hydrolysis after completion of the principal reaction.

In the case where each of X and Y is hydrogen, a 6,7-chloromethylene or 6,7-dichloromethylene compound of the present invention, introduced as outlined above, is reductively dehalogenated as with lithium aluminum hydride in organic solvent. Such a delogenation should be followed by an oxidation to regenerate any keto groups, which when unprotected are reduced during the treatment with lithium aluminum hydride. Thus, for example, a 3-keto-6,7-dichloromethylene - $\Delta^4$ - pregnene is first reductively dehalogenated to a 3 - hydroxy-6,7-methylene-$\Delta^4$-pregnene which upon treatment with 2,3-dichloro-5,6-dicyano-benzoquinone yields the corresponding 3-keto-6,7-methylene-$\Delta^4$-pregnene.

Alternatively, compounds wherein each of X and Y is hydrogen are directly generated by the action of dimethylsulfoxonium methylide in dimethylsulfoxide on a 3-keto-$\Delta^{4,6}$-diene.

The addition of the methylene, monohalomethylene, and dihalomethylene groups in accordance with the procedures set forth herein at position C–6, 7 is accomplished with the orientation of the resultant fused grouping including both isomeric alpha and beta configurations in variable ratios. In some instances, one particular configurational isomer predominates in the reaction mixture. The isomeric product mixture in each instance is conveniently and readily subjected to conventional techniques, such as chromatography, fractional crystallization, and the like, by which the alpha and beta isomers are separated by virtue of their different physical properties. Each isomer or isomeric mixture can thereafter be subjected to further elaboration as desired at other parts of the molecule as hereinafter set forth.

It will be understood that each of the isomers in each series is included within the scope of this invention.

In the preferred embodiment of this invention, compounds wherein $R^3$ is hydroxy can be protected prior to the principal reactions by which the methylene and halomethylene groups are introduced at C–6, 7 through formation of the 16α,17α - isopropylidenedioxy derivative. Generally, starting compounds may be directly subjected to the principal processes of this invention, hydroxy groups, as previously noted, being preferably protected as through formation of an ether or ester grouping.

Starting compounds are chosen which already possess the necessary unsaturation between the C–6, 7 carbon atoms, for the principal reactions hereof described above, and other elaboration at other parts of the molecule as desired.

As previously described, the introduction of the 6,7-methylene or -halomethylene group is effected with compounds already bearing a $\Delta^{4,6}$-diene or $\Delta^{1,4,6}$-triene system. The $\Delta^{4,6}$-diene unsaturation is introduced by treatment of a $\Delta^4$-ene with chloranil in the presence of ethyl acetate and acetic acid, the $\Delta^{1,4,6}$-triene unsaturation by treatment of the $\Delta^{4,6}$-diene with chloranil in the presence of (lower)-alkanol, such as n-amyl alcohol. Alternatively, the $\Delta^{1,4}$-diene sysem can be introduced at a subsequent stage, such as with 2,3-dichloro-5,6-dicyanobenzoquinone.

The 21-unsubstituted derivatives can be prepared from the corresponding 21-hydroxy compound, obtained upon hydrolysis of the $17\alpha,20;20,21$ - bismethylenedioxy intermediate with hydrofluoric acid or formic acid. Thus, the 21-hydroxy compound is treated with methanesulfonyl chloride and the resulting ester is then converted to the corresponding 21-iodo intermediate by the action of sodium iodide. The 21-iodo intermediate upon the action of sodium metabisulfite then yields the 21 - unsubstituted compound.

With the exception of methylene, the substituents represented by $R^3$ are present in the starting material as qualified above when $R^3$ is hydroxy. The 16-methylene substituent is introduced after the principal reactions by formation of the 3,20-bis semicarbazone and treatment with acetic acid and pyruvic acid to yield the 3,20-diketo-$\Delta^{16}$-ene. Treatment of this compound with diazomethane and pyrolysis produces the corresponding 16-methyl-$\Delta^{16}$-ene and epoxidation as with perbenzoic acid, and ring opening with hydrogen bromide in acetic acid affords the 16-methylene-17-ols. This process is described in U.S. Pat. 3,312,692.

Tertiary hydroxyl esterification procedures provide the 17α-esters hereof.

The substituents represented by $R^6$ and $R^7$ are likewise preferably present in the starting material although the 6-chloro and 6-fluoro groups can be introduced upon treatment of the enol ether (prepared from the 3-keto-$\Delta^4$-ene with ethyl orthoformate) with N-chlorosuccinimide and perchloryl fluoride, respectively, followed by double bond regeneration. The regeneration of the double bond between C–6,7 follows upon treatment of the 3-keto-6-substituted-$\Delta^4$ derivatives with chloranil to give the corresponding $\Delta^{4,6}$-diene directly or by first forming the enol ether of the 6-substituted compound and treating this with 2,3-dichloro-5,6-dicyanobenzoquinone in the presence of p-toluenesulfonic acid to alternatively give the corresponding $\Delta^{4,6}$-diene compound.

The following examples will serve to further typify the nature of this invention. As these are presented solely for the purpose of illustration, they should not be construed as a limitation on the scope of this invention. In some instances for convenience, the various isomeric forms are specified; however, it will be understood that in any of the reaction steps both the alpha and beta isomers at C–6,7 are included within the scope hereof. Thus, the use of the phrase 6,7-difluoro-methylene in a compound name includes both the corresponding 6α,7α-difluoromethylene and 6β,7β-difluoromethylene compounds.

EXAMPLE 1

To a suspension of 1 g. of 17α-acetoxy-19-norpregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water, and air dried to yield 3-ethoxy-17α-acetoxy-19-norpregna-3,5(6)-dien-20-one which is recrystallized from acetone:hexane.

To a solution of 1 g. of 3-ethoxy-17α-acetoxy-19-norpregna-3,5(6)-dien-20-one in 20 ml. of tetrahydrofuran, cooled to 0° C., is added 1.05 molar equivalents of 2,3-dichloro-5,6-dicyano-1,4-benzoquinone and 100 mg. of p-toluenesulfonic acid. The resulting mixture is stirred at 0° C. for 30 minutes, filtered, and diluted with 100 ml. of methylene chloride. The organic phase is separated, washed with 5% aqueous sodium hydroxide solution until the washings are colorless and then with water to neutrality, dried over sodium sulfate, and evaporated to dryness to yield 17α-acetoxy-19-norpregna-4,6-diene - 3,20 - dione which may be further purified through recrystallization from acetone:hexane.

To a gently refluxing solution of 1 g. of 17α-acetoxy-19-norpregna-4,6-diene-3,20-dione in 20 ml. of dimethyl diethylene glycol is added with stirring and in a dropwise fashion a 1:2 2/v. solution of sodium chlorodifluoroacetate in dimethyl diethyleneglycol ether. The addition is stopped after the introduction of further reagent fails to substantially change the U.V. spectrum. The mixture is then filtered and evaporated to dryness. The residue thus obtained is chromatographed on alumina with methylene chloride to yield 6α,7α-difluoromethylene-17α-acetoxy-19-norpregn-4-ene-3,20-dione and 6β,7β-difluoromethylene-17α-acetoxy-19-norpregn-4-ene-3,20-dione.

Likewise, the following are thus prepared: 6β-fluoro-6α,7α-difluoromethylene-17α-acetoxypregn - 4 - en - 3,20-dione; 6α,7α - difluoromethylene-17α-acetoxypregn-4-ene-3,20 - dione; 6β-chloro-6α,7α-difluoromethylene-17α-acetoxypregn-4-ene-3,20-dione; 6β-chloro-6α,7α-difluoromethylene-17α-acetoxypregna-1,4-diene-3,20-dione, as well as the corresponding 6β,7β derivatives thereof.

In a similar fashion, the following compounds are obtained from the corresponding 3-keto-Δ4,6-dienes according to the final procedure of this example or from the corresponding 3-keto-Δ4-ene according to all the procedures of this example:

6,7-difluoromethylene-17α-acetoxypregna-1,4-diene-3,20-dione;
6,7-difluoromethylene-16β-methylpregn-4-en-17α-acetoxy-3,20-dione;
6,7-difluoromethylenepregn-4-ene-3,20-dione;
6,7-difluoromethylene-16β-methylpregn-4-ene-3,20-dione;
6,7-difluoromethylene-16β-methylpregna-1,4-diene-3,20-dione;
6-chloro-6,7-difluoromethylene-16β-methylpregn-4-ene-3,20-dione; and
6-chloro-6,7-difluoromethylene-16β-methylpregna-1,4-diene-3,20-dione.

EXAMPLE 2

6,7-difluoromethylenepregn-4-ene - 17α,21 - diol - 3,20-dione is prepared as follows:

To a solution of 5 g. of pregna-4,6-diene-17α,21-diol-3,20-dione in 200 ml. of chloroform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate and evaporated to dryness to yield 17α,20;20,21-bismethylenedioxypregna-4,6-dien-3-one which is recrystallized from methanol:ether.

To a gently refluxing and stirred solution of 1 g. of 17α,20;20,21-bismethylenedioxypregna-4,6-dien-3-one in 8 ml. of dimethyl diethylene glycol ether is added in a dropwise fashion over a two-hour period, a solution of 30 equivalents of sodium chlorodifluoroacetate in 30 ml. of dimethyl diethyleneglycol ether. At the end of the reaction period, which may be followed by the U.V. spectra, the mixture is filtered and evaporated in vacuo to dryness. The residue is added to 10% methanolic potassium hydroxide and this mixture is heated briefly at reflux and poured into ice water. The solid which forms is collected, washed with water, dried and chromatographed on alumina, eluting with methylene chloride to yield 6α,7α-difluoromethylene-17α,20;20,21 - bismethylenedioxypregn-4-en-3-one and 6β,7β-difluoromethylene-17α,20;20,21-bis-methylenedioxypregn-4-en-3-one.

A suspension of 1 g. of 6,7-difluoromethylene-17α,20;-20,21-bismethylenedioxypregn-4-en-3-one in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 6α,7α-difluoromethylenepregn-4-ene-17α,21-diol-3,-20-dione and the 6β,7β isomer which are further purified through recrystallization from isopropanol.

This compound is then treated as follows:

A mixture of 1.34 g. of 6,7-difluoromethylenepregn-4-ene-17α,21-diol-3,20-dione, 0.38 ml. of methanesulfonyl chloride, and 10 ml. of pyridine is allowed to stand at room temperature for 16 hours and is then poured into ice water and extracted with methylene chloride. The extracts are washed with 2 N hydrochloric acid, aqueous potassium bicarbonate solution, and saturated aqueous sodium chloride solution, dried over magnesium sulfate, and evaporated to dryness. This residue and 3.6 g. of sodium iodide is added to 150 ml. of acetone, boiled for 40 minutes, and evaporated to dryness under reduced pressure. The residue is extracted with methylene chloride. These extracts are washed with saturated aqueous sodium chloride solution, dried over magnesium sulfate, and evaporated to dryness. A suspension of the residue and 2.6 g. of sodium metabisulfite in 300 ml. of 80% aqueous ethanol is heated at reflux for one hour and then evaporated under reduced pressure at a temperature below 45° C. The residue is partitioned between water and methylene chloride and the phases are then separated. The organic phase is washed with saturated aqueous sodium chloride solution, dried, and evaporated to dryness to yield 6,7-difluoromethylenepregn-4-en-17α-ol-3,20-dione which may be further purified through recrystallization from acetone: hexane.

A mixture of 1 g. of 6,7-difluoromethylenepregn-4-en-17α-ol-3,20-dione, 1 g. of p-toluenesulfonic acid monohydrate, 50 ml. of acetic acid, and 25 ml. of acetic anhydride is allowed to stand at room temperature for 24 hours and then poured into water and stirred. This mixture is then extracted with methylene chloride and these extracts are dried and evaporated to yield 6,7-difluoromethylene-17α-acetoxypregn-4-ene-3,20-dione which is recrystallized from acetone:ether.

EXAMPLE 3

A mixture of 1 g. of pregn-4-en-17α-ol-3,20-dione, 1 g. of p-toluenesulfonic acid monohydrate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 17α-acetoxypregn-4-ene-3,20-dione which is recrystallized from acetone:ether.

To a suspension of 1 g. of 17α-acetoxypregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxy-17α-acetoxypregna-3,5(6)-dien-20-one which is recrystallized from acetone:hexane.

A mixture of 5 g. of 3-ethoxy-17α-acetoxypregna-3,5(6)-dien-20-one, 2 g. of anhydrous sodium acetate and 100 ml. of acetone is treated with 32 ml. of water. The solution is cooled to 5° C. and 1.1 molar equivalents of N-chlorosuccinimide and 2 ml. of glacial acetic acid are added. The mixture is stirred for 30 minutes at the same temperature and then diluted with water. After being allowed to stand at 0° C. for 15 hours, the solid is collected by filtration, washed with water and dried under vacuum to yield 6β-chloro-17α-acetoxypregn-4-ene-3,20-dione which is recrystallized from acetone. The corresponding 6α-chloro compound is obtained by dissolving this compound in glacial acetic acid and introducing a slow stream of anhydrous hydrogen chloride over a period of four hours and a temperature of 15° C. The solid which forms upon pouring this mixture into water is collected by filtration, washed with water and dried to yield 6α-chloro-17α-acetoxypregn-4-ene-3,20-dione which is recrystallized from acetone:hexane.

A mixture of 1 g. of 6α-chloro-17α-acetoxypregn-4-ene-3,20-dione, 2 g. of chloranil, 15 ml. of ethyl acetate and 5 ml. of acetic acid is refluxed under nitrogen for 96 hours. The mixture is then cooled and washed with cold 10% aqueous sodium hydroxide until the washings were colorless. The organic solution is dried over sodium sulfate and the ethyl acetate removed by evaporation. Upon chromatography of the residue on neutral alumina, there is obtained 6-chloro-17α-acetoxypregna-4,6-diene-3,20-dione which may be further purified by recrystallization from acetone:hexane.

To a stirred and refluxing solution of 1 g. of 6-chloro-17α-acetoxypregna-4,6-diene-3,20-dione in 8 ml. of dimethyl diethylene glycol ether is added in a dropwise fashion over a two-hour period a solution of 30 equivalents of sodium chlorodifluoroacetate in 30 ml. of dimethyl diethylene glycol ether. At the end of the reaction period, which may be followed by the U.V. spectra, the mixture is filtered and evaporated in vacuo to dryness. The residue is chromatographed on silica and alumina, eluting successively with methylene chloride:hexane, methylene chloride and methylene chloride:acetone to obtain the 6α,7α-difluoromethylene-6β-chloro-17α-acetoxypregn-4-ene-3,20-dione and 6β,7β-difluoromethylene-6α-chloro-17α-acetoxypregn-4-ene-3,20-dione products.

A mixture of 1 g. of 6,7-difluoromethylene-6-chloro-17α-acetoxypregn-4-ene-3,20-dione, 2 g. of chloranil and 10 ml. of n-amyl alcohol are refluxed under nitrogen for 24 hours. The mixture is then cooled, washed with a cold aqueous solution of 10% sodium hydroxide until the washings are colorless, dried over sodium sulfate and evaporated. Chromatography of the residue on neutral alumina yields 6,7-difluoromethylene-6-chloro-17α-acetoxypregna-1,4-diene-3,20-dione which may be further purified through recrystallization from acetone:hexane.

EXAMPLE 4

To a suspension of 1 g. of pregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxypregna-3,5(6)-dien-20-one which is recrystallized from acetone:hexane.

A stream of perchloryl fluoride is passed through a solution of 1 g. of 3-ethoxypregna-3,5(6)-dien-20-one in 25 ml. of dimethylformamide, cooled to 0° C., for five minutes. After being allowed to slowly attain a temperature of 20° C., the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to separate the 6α-fluoro and 6β-fluoro isomers. The latter, which predominates, is dissolved in 20 ml. of glacial acetic acid and through this solution is passed a stream of dry hydrogen chloride for a period of 24 hours and at a temperature of 15° C. The mixture is poured into cold water and the solid which forms is collected by filtration, washed with water and dried to yield 6α-fluoropregn-4-ene-3,20-dione which is recrystallized from acetone-hexane.

One gram of 6α-fluoropregn-4-ene-3,20-dione and 2 g. of chloranil in 50 ml. of t-butanol are heated at reflux for eight hours. The cooled reaction mixture is filtered and the solid thus separated is washed with a large volume of ethyl acetate. The combined filtrate and washings are in turn washed with cold 10% aqueous sodium hydroxide until the washings are colorless, dried over sodium sulfate and evaporated to dryness to yield 6-fluoropregna-4,6-diene-3,20-dione which may be further purified through chromatography with alumina and recrystallization from methylene chloride:ether.

To a stirred and refluxing solution of 1 g. of 6-fluoropregna-4,6-diene-3,20-dione in 8 ml. of dimethyl diethylene glycol ether is added in a dropwise fashion over a two-hour period, a solution of 30 equivalents of sodium chlorodifluoroacetate in 30 ml. of dimethyl diethylene glycol ether. At the end of the reaction period, which may be followed by the U.V. spectra, the mixture is filtered and evaporated in vacuo to dryness. The residue is added to 10% methanolic potassium hydroxide and this mixture is heated briefly at reflux and poured into ice water. The solid which forms is collected, washed with water, dried and chromatographed on alumina, eluting with methylene chloride, to yield 6α,7α-difluoromethylene-6β-fluoropregn-4-ene-3,20-dione and 6β,7β-difluoromethylene-6α-fluoropregn-4-ene-3,20-dione.

A mixture of 1 g. of 6,7-difluoromethylene-6-fluoropregn-4-ene-3,20-dione, 2 g. of chloranil and 10 ml. of n-amyl alcohol are refluxed under nitrogen for 24 hours. The mixture is then cooled, washed with a cold aqueous solution of 10% sodium hydroxide until the washings were colorless, dried over sodium sulfate and evaporated. Chromatography of the residue on neutral alumina yields 6,7-difluoromethylene-6-fluoropregna-1,4-diene-3,20-dione which may be further purified through recrystallization from acetone:hexane.

EXAMPLE 5

A refluxing solution of 1 g. of pregna-4,6-diene-3,20-dione in 15 ml. of dimethyl diethylene glycol ether, under nitrogen, is treated in a dropwise fashion with a 50% w./v. solution of sodium trichloroacetate in dimethyl diethylene glycol. When there is no change in the U.V. spectrum upon the addition of five equivalents of reagent, the refluxing is discontinued. The reaction mixture is filtered and chromatographed on alumina with 3:1 hexane:methylene chloride to yield 6α,7α-dichloromethylene-pregn-4-ene-3,20-dione and the corresponding 6β,7β-dichloromethylenepregn-4-ene-3,20-dione.

In like manner, the other $\Delta^{4,6}$-dienes of this invention are thus treated to furnish the corresponding 6α,7α- and 6β,7β-dichloromethylene derivatives thereof. For example, 6α,7α-dichloromethylene-17α-acetoxypregn-4-ene-3,20-dione as well as the corresponding 6β,7β compound are thus prepared.

EXAMPLE 6

A solution of 1 g. of 6α,7α-dichloromethylene-17α,20;20,21-bismethylenedioxypregn-4-en-3-one in anhydrous ethyl ether is stirred under nitrogen for 48 hours with a molar excess of lithium aluminum hydride. At the end of this time, the mixture is cautiously treated with 2 ml. of ethyl acetate and 1 ml. of water and filtered. The solid is washed well with hot ethyl acetate. The combined organic solutions are then dried over sodium sulfate and evaporated to dryness. This residue, in sufficient dioxane, is mixed with 1.1 molar equivalents of 2,3-dichloro-5,6-dicyano-1,4-benzoquinone and allowed to stand at 24° C. for three hours. After filtration, the solution is evaporated to dryness and the residue dissolved in acetone and filtered through alumina to yield, after evaporation, 6α,7α-methylene - 17α,20;20,21 - bismethylenedioxypregn - 4-en-3-one.

Similarly, by starting with 6β,7β-dichloromethylene-17α;20;20,21-bismethylenedioxypregn-4-en-3-one there is obtained 6β,7β - methylene - 17α,20;20,21 - bismethylenedioxypregn-4-en-3-one.

Likewise, the other 6,7-dichloromethylene compounds hereof are thus treated to furnish the corresponding 6,7-methylene derivatives thereof.

A suspension of 1 g. of 6,7-methylene-17α,20;20,21-bismethylenedioxypregn-4-en-3-one in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 6,7-methylenepregn-6-ene-17α,21-diol-3,20-dione which may be further purified through recrystallization from isopropanol.

A mixture of 1.34 g. of 6,7-methylenepregn-4-ene-17α-21-diol-3,20-dione, 0.38 ml. of methanesulfonyl chloride and 10 ml. of pyridine is allowed to stand at room temperature for 16 hours and is then poured into ice water and extracted with methylene chloride. The extracts are washed with 2 N hydrochloric acid, aqueous potassium bicarbonate solution, and saturated aqueous sodium chloride solution, dried over magnesium sulfate, and evaporated to dryness. This residue and 3.6 g. of sodium iodide are added to 150 ml. of acetone, boiled for 40 minutes, and evaporated to dryness under reduced pressure. The residue is extracted with methylene chloride. These extracts are washed with saturated aqueous sodium chloride solution, dried over magnesium sulfate, and evaporated to dryness. A suspension of the residue and 2.6 g. of sodium metabisulfite in 300 ml. of 80% aqueous ethanol is heated at reflux for one hour and then evaporated under reduced pressure at a temperature below 45° C. The residue is partitioned between water and methylene chloride and the phases are then separated. The organic phase is washed with saturated aqueous sodium chloride solution, dried, and evaporated to dryness to yield 6,7-methylenepregn-4-en-17α-ol-3,20-dione which may be further purified through recrystallization from acetone:hexane.

A mixture of 1 g. of 6,7-methylenepregn-4-en-17α-ol-3,20-dione, 1 g. of p-toluenesulfonic acid monohydrate, 50 ml. of acetic acid, and 25 ml. of acetic anhydride is allowed to stand at room temperature for 24 hours and then poured into water and stirred. This mixture is then extracted with methylene chloride and these extracts are dried and evaporated to yield 6,7-methylene-17α-acetoxypregn-4-ene-3,20-dione which is recrystallized from acetone:ether.

The following compounds are similarly obtained:

6,7-methylene-6β-fluoro-17α-acetoxypregn-4-ene-3,20-dione;
6,7-methylene-6β-chloro-17α-acetoxypregn-4-ene-3,20-dione;
6,7-methylene-16α-methyl-17α-acetoxypregn-4-ene-3,20-dione;
6,7-methylene-6β-chloro-16β-methyl-17α-acetoxypregn-4-ene-3,20-dione;
6,7-methylene-6β-fluoro-16β-methyl-17α-acetoxypregn-4-ene-3,20-dione;
6,7-methylene-17α-acetoxypregna-1,4-diene-3,20-dione; and
6-chloro-6,7-methylene-17α-acetoxypregna-1,4-diene-3,20-dione.

EXAMPLE 7

A mixture of 1 g. of 16β-methylpregn-4-en-17α-ol-3,20-dione, 2 g. of chloranil, and 10 ml. of xylene is refluxed under an atmosphere of nitrogen for 16 hours. The mixture is cooled, washed with a cold 10% sodium hydroxide solution, and then with water, dried over sodium sulfate, and evaporated under reduced pressure. The residue is chromatographed on neutral alumina and further purified through recrystallization from acetone:hexane to yield 16β-methylpregna-4,6-diene-17α-ol-3,20-dione.

A solution of 0.5 g. of 16β-methylpregna-4,6-dien-17α-ol-3,20-dione in 5 ml. of dimethylsulfoxide is added to a solution of one equivalent of dimethylsulfoxonium methylide in dimethylsulfoxide, prepared in the manner of Corey et al., J.A.C.S. 87, 1353 (1965). The mixture is stirred under nitrogen and at room temperature for 20 hours and then at 50° C. for seven hours. Fifty milliliters of water are then added and the resulting mixture extracted four times with 50 ml. portions of ethyl acetate. The combined extracts are washed with water and saturated aqueous sodium chloride solution, dried over sodium sulfate, and evaporated to dryness. This residue is then chromatographed on silica, eluting with 1:9 ether:methylene chloride to yield 6β,7β-methylene-16β-methylpregn-4-en-17α-ol-3,20-dione and the corresponding 6α,7α-methylene-16β-methylpregn-4-en-17α-ol-3,20-dione.

In like manner, the other $\Delta^{4,6}$-dienes of this invention are thus treated to furnish the corresponding 6α,7α- and 6β,7β-methylene derivatives thereof.

A mixture of 0.5 g. of 6,7-methylene-16β-methylpregn-4-en-17α-ol-3,20-dione, 10 ml. of dioxane, and 0.35 g. of 2,3-dichloro-5,6-dicyano-1,4-benzoquinone is refluxed for ten hours. The mixture is then cooled, filtered, and evaporated to dryness. The residue is dissolved in acetone and this solution is then filtered through 10 g. of alumina and concentrated to yield 6,7-methylene-16β-methylpregna-1,4-dien-17α-ol-3,20-dione which is further purified by recrystallization from acetone:hexane.

Other compounds obtained according to the foregoing procedures include:

6,7,-methylene-16α-methylpregna-1,4-dien-17α-ol-3,20-dione;
6,7-methylene-16β-methylpregna-1,4-diene-3,20-dione;
6,7-methylenepregn-4-ene-17α-ol-3,20-dione;
6,7-methylenepregn-4-ene-3,20-dione;
6,7-methylene-16β-methylpregn-4-ene-17α-ol-3,20-dione; and
6,7-methylene-16β-methylpregn-4-ene-3,20-dione.

EXAMPLE 8

The procedure set forth in the third paragraph of Example 1 is repeated with the exception of using the appropriate quantity of sodium dichlorofluoroacetate in lieu of sodium chlorodifluoroacetate to yield the corresponding 6α,7α - chlorofluoromethylene-17α-acetoxy-19-norpregn-4-ene-3,20-dione and the corresponding 6β,7β-chlorofluoro fluoromethylene isomer.

Similarly, the other $\Delta^{4,6}$-dienes of this invention are thus treated to furnish the corresponding 6,7-chlorofluoromethylene compounds.

In like manner, the use of sodium chlorofluoroacetate and sodium dichloroacetate instead of sodium chlorodifluoroacetate affords the corresponding 6,7-monofluoromethylene and 6,7-monochloromethylene compounds of the $\Delta^{4,6}$-dienes of this invention.

EXAMPLE 9

To a suspension of 1 g. of 6,7-difluoromethylenepregn-4-en-17α-ol-3,20-dione in 27 ml. of methanol and 1 ml. of water, under nitrogen, is added 1.4 g. of semicarbazide hydrochloride and 0.74 g. of sodium bicarbonate. The mixture is heated at reflux for three hours and then at 45° C. for 20 hours. The suspension is cooled and 36 ml. of water are slowly added. The solid is collected by filtration, washed with water and dried to yield 6,7-difluoromethylenepregn-4-en-17α-ol-3,20-bis semicarbazone which is recrystallized from pyridine:methanol.

A solution of 1 g. of 6,7-difluoromethylenepregn-4-en-17α-ol-3,20-bis semicarbazone in 20 ml. of acetic acid and 1 ml. of acetic anhydride is heated at reflux under nitrogen for one hour. The reaction mixture is then concentrated under reduced pressure to a volume of about 12 ml. and treated with 6 ml. of water and 3 ml. of pyruvic acid. The mixture is allowed to stand at room temperature for 40 hours and at 60° C. for two hours and is then diluted with water and extracted with chloroform. These extracts are washed with water, dilute potassium bicarbonate solution and water, dried over magnesium sulfate, and evaporated to dryness under reduced pressure. The residue is chromatographed on neutral alumina with benzene to yield 6,7-difluoromethylenepregna-4,16-diene-3,20-dione which may be recrystallized from acetone: ether.

A solution of 1 g. of 6,7-difluoromethylenepregna-4,16-diene-3,20-dione in 30 ml. of an ethereal solution of diazomethane is allowed to stand at room temperature for 24 hours. One milliliter of acetic acid is then added to a mixture which is then evaporated to dryness under reduced pressure. The residue is heated gradually to 180° C. in vacuo, cooled and recrystallized from acetone:hexane to yield 6,7-difluoromethylene-16-methylpregna-4,16-diene-3,20-dione.

To a stirred solution of 5 g. of 6,7-difluoromethylene-16-methylpregna-4,16-diene - 3,20 - dione in 350 ml. of methanol, is added 20 ml. of 4 N aqueous sodium hydroxide and 20 ml. of 30% hydrogen peroxide, maintaining a temperature of approximately 15° C. The solution is allowed to stand at 0° C. for 15 hours and then poured into ice water. The solid which forms is collected by filtration, washed with water and dried to yield 6,7-difluoromethylene-16α,17α - oxido - 16β - methylpregn-4-ene-3,20-dione which may be further purified by recrystallization from acetone:hexane.

To a solution of 1 g. of 6,7-difluoromethylene-16α,17α-oxido-16β-methylpregn-4-ene-3,20-dione in 10 ml. of dioxane is added 0.5 ml. of a 50% 2/v. solution of hydrogen bromide in acetic acid. After being allowed to stand for 10 minutes at room temperature, the mixture is poured into water and extracted with ether. These ethereal extracts are dried over sodium sulfate and evaporated to dryness to yield 6,7-difluoromethylene-16-methylenepregn-4-en-17α-ol-3,20-dione which may be further purified through recrystallization from acetone:hexane.

In like manner, the 6,7-dichloromethylene- and the 6,7-monofluoro- and the 6,7-monochloro- and the 6,7-methylene compounds are prepared from the respective C-6,7 substituted starting derivatives.

In accordance with the above, the following are also prepared.

6,7-difluoromethylene-16-methylene-19-norpregn-4-ene-3,20-dione;
6,7-difluoromethylene-16-methylenepregna-1,4-diene-3,20-dione;
6,7-difluoromethylene-16-methylenepregna-1,4-diene-17α-ol-3,20-dione;
6,7-difluoromethylene-16-methylene-17α-acetoxypregna-1,4-diene-3,20-dione;
6,7-difluoromethylene-6-chloro-16-methylene-19-norpregn-4-ene-3,20-dione;
6,7-difluoromethylene-6-chloro-16-methylene-17α-acetoxypregna-1,4-diene-3,20-dione;
6,7-difluoromethylene-6-chloro-16-methylene-17α-acetoxypregn-4-ene-3,20-dione;
6,7-difluoromethylene-6-fluoro-16-methylenepregn-4-en-17α-ol-3,20-dione;
6,7-difluoromethylene-6-fluoro-16-methylene-17α-acetoxypregna-1,4-diene-3,20-dione;
6,7-difluoromethylene-6-methyl-16-methylene-19-norpregn-4-en-17α-ol-3,20-dione;
6,7-difluoromethylene-6-methyl-16-methylenepregn-4-ene-3,20-dione;
6,7-difluoromethylene-6-chloro-16-methylene-17α-propionyl-oxypregna-1,4-diene-3,20-dione;
6,7-difluoromethylene-6-fluoro-16-methylene-17α-caproyloxypregna-1,4-diene-3,20-dione;
6,7-difluoromethylene-6-fluoro-16-methylene-17α-pentanoyl-oxypregn-4-ene-3,20-dione;
6,7-difluoromethylene-16-methylene-17α-acetoxypregn-4-ene-3,20-dione;
6,7-difluoromethylene-6-fluoro-16-methylene-17α-acetoxypregn-4-ene-3,20-dione;
6,7-difluoromethylene-6-chloro-16-methylenepregn-4-en-17α-ol-3,20-dione;
6,7-difluoromethylene-6-fluoro-16-methylene-17α-acetoxy-19-norpregn-4-ene-3,20-dione;
6,7-difluoromethylene-6-chloro-16-methylenepregna-1,4-dien-17α-ol-3,20-dione;
6,7-difluoromethylene-6-fluoro-16-methylenepregna-1,4-dien-17α-ol-3,20-dione;
6,7-difluoromethylene-6-chloro-16-methylene-17α-acetoxy-19-norpregn-4-ene-3,20-dione; and
6,7-difluoromethylene-6-fluoro-16-methylene-19-norpregn-4-en-17α-ol-3,20-dione.

Also prepared are the corresponding 6,7-dichloromethylene - 6,7-monofluoromethylene-, 6,7-monochloromethylene and 6,7-methylene derivatives thereof, that is, 6,7-dichloromethylene-16-methylene-19-norpregn-4-ene-3,20-dione;
6,7-monofluoromethylene-16-methylene-19-norpregn-4-ene-3,20-dione;
6,7-monochloromethylene-16-methylene-19-norpregn-4-ene-3,20-dione;
6,7-methylene-16-methylene-19-norpregn-4-ene-3,20-dione;
6,7-dichloromethylene-16-methylenepregna-1,4-diene-3,20-dione;
6,7-monofluoromethylene-16-methylenepregna-1,4-diene-3,20-dione;
6,7-monochloromethylene-16-methylenepregna-1,4-diene-3,20-dione;
6,7-methylene-16-methylenepregna-1,4-diene-3,20-dione;
6,7-dichloromethylene-16-methylenepregna-1,4-dien-17α-ol-3,20-dione;
6,7-monofluoromethylene-16-methylenepregna-1,4-dien-17α-ol-3,20-dione;
6,7-monochloromethylene-16-methylenepregna-1,4-dien-17α-ol-3,20-dione;
6,7-methylene-16-methylenepregna-1,4-dien-17α-ol-3,20-dione;
6,7-dichloromethylene-16-methylene-17α-acetoxypregna-1,4-dien-3,20-dione;
6,7-monofluoromethylene-16-methylene-17α-acetoxypregna1,4-dien-3,20-dione;
6,7-monochloromethylene-16-methylene-17α-acetoxypregna-1,4-dien-3,20-dione;
6,7-methylene-16-methylene-17α-acetoxypregna-1,4-dien-3,20-dione;
6,7-dichloromethylene-6-chloro-16-methylene-19-norpregn-4-ene-3,20-dione; and so forth.

In accordance with the above methods, the following compounds, including each of the respective 6α, 7α and 6β, 7β-isomers thereof are prepared:

6,7-monofluoromethylene-17α-acetoxypregn-4-ene-3,20-dione;
6,7-dichloromethylene-17α-acetoxypregn-4-ene-3,20-dione;
6,7-methylenepregn-4-ene-17α-ol-3,20-dione;

6,7-monofluoromethylenepregn-4-en-17α-ol-3,20-dione;
6,7-difluoromethylene-16α-methylpregn-4-en-17α-ol-3,20-dione;
6,7-monochloromethylene-16α-methylpregn-4-en-17α-ol-3,20-dione;
6,7-difluoromethylene-16β-methyl-19-norpregn-4-en-17α-ol-3,20-dione;
6,7-chloromethylene-16β-methyl-19-norpregn-4-en-17α-ol-3,20-dione;
6,7-dichloromethylene-16β-methylpregn-4-en-17α-ol-3,20-dione;
6,7-difluoromethylene-6-methylpregn-4-ene-3,20-dione;
6,7-monofluoromethylene-6-methylpregn-4-ene-3,20-dione;
6,7-difluoromethylene-6-fluoropregn-4-ene-3,20-dione;
6,7-methylene-6-fluoropregn-4-ene-3,20-dione;
6,7-difluoromethylene-6-fluoro-17α-acetoxy-19-norpregn-4-ene-3,20-dione;
6,7-dichloromethylene-6-fluoro-17α-acetoxypregn-4-ene-3,20-dione;
6,7-difluoromethylene-6,16α-dichloropregn-4-en-17α-ol-3,20-dione;
6,7-monofluoromethylene-6,16α-dichloropregn-4-en-17α-ol-3,20-dione;
6,7-difluoromethylene-6-chloro-16β-methyl-17α-acetoxypregn-4-ene-3,20-dione;
6,7-monochloromethyene-6-chloro-16β-methyl-17α-acetoxypregn-4-ene-3,20-dione;
6,7-methylene-16α-fluoropregn-4-en-17α-ol-3,20-dione;
6,7-dichloromethylene-16α-fluoropregn-4-en-17α-ol-3,20-dione;
6,7-difluoromethylene-6,16β-dimethylpregn-4-ene-3,20-dione;
6,7-methylene-6,16β-dimethylpregn-4-ene-3,20-dione;
6,7-difluoromethylene-6,16β-dimethyl-19-norpregn-4-en-17α-ol-3,20-dione;
6,7-monochloromethylene-6,16β-dimethylpregn-4-en-17α-ol-3,20-dione;
6,7-difluoromethylene-6-fluoro-17α-adamantoyloxypregn-4-ene-3,20-dione;
6,7-chlorofluoromethylene-6-fluoro-17α-adamantoyloxypregn-4-ene-3,20-dione;
6,7-dichloromethylene-6-fluoro-17α-adamantoyloxypregn-4-ene-3,20-dione;
6,7-difluoromethylene-6,16α-difluoro-17α-propionyloxy-19-norpregn-4-ene-3,20-dione;
6,7-monofluoromethylene-6,16α-difluoro-17α-propionyloxypregn-4-ene-3,20-dione;
6,7-difluoromethylene-6-fluoro-16-methylenepregn-4-ene-3,20-dione;
6,7-methylene-6-fluoro-16-methylenepregn-4-ene-3,20-dione;
6,7-difluoromethylene-6-fluoro-16β-methyl-17α-(n-butyryloxy)-21-fluoropregn-4-ene-3,20-dione;
6,7-dichloromethylene-6-fluoro-16β-methyl-17α-(n-butyryloxy)-21-fluoropregn-4-ene-3,20-dione;
6,7-methylene-17α-caproxyloxypregn-4-ene-3,20-dione;
6,7-monofluoromethylene-17α-caproyloxy-19-norpregn-4-ene-3,20-dione;
6,7-difluoromethylene-6,16α-dichloropregn-4-ene-3,20-dione;
6,7-monochloromethylene-6,16α-dichloropregn-4-ene-3,20-dione;
6,7-difluoromethylene-6,16β-dimethylpregn-4-ene-3,20-dione;
6,7-dichloromethylene-6,16β-dimethylpregn-4-ene-3,20-dione;
6,7-difluoromethylene-6-methyl-16α-chloro-17α-acetoxy-19-norpregn-4-ene-3,20-dione;
6,7-monofluoromethylene-6-methyl-16α-chloro-17α-acetoxypregn-4-ene-3,20-dione;
6,7-difluoromethylenepregn-4-en-16α-ol-3,20-dione;
6,7-chlorofluoromethylenepregn-4-en-16α-ol-3,20-dione;
6,7-methylene-6-chloropregn-4-en-16α,17α-diol-3,20-dione;
6,7-difluoromethylene-6-chloro-17α-(β-chloropropionyloxy)pregn-4-ene-3,20-dione;
6,7-dichloromethylene-6-chloro-17α-(β-chloropropionyloxy)pregn-4-ene-3,20-dione;
6,7-difluoromethylene-6-fluoro-16-methylenepregn-4-en-17α-ol-3,20-dione; and
6,7-methylene-6-fluoro-16-methylenepregn-4-en-17α-ol-3,20-dione.
6,7-methylenepregn-4-ene-16α,17α-diol-3,20-dione;
6,7-difluoromethylene-16α,17α-diacetoxypregna-1,4-diene-3,20-dione;
6,7-monochloromethylene-6-methyl-16α-propionyloxypregna-1,4-diene-17α-ol-3,20-dione;
6,7-difluoromethylene-16α,17α-diacetoxy-19-norpregn-4-ene-3,20-dione;
6,7-methylene-19-norpregn-4-ene-16α,17α-diol-3,20-dione;
and
6,7-monofluoromethylene-19-norpregn-4-en-16α-ol-3,20-dione.

The 16α-chloro and 16α-fluoro starting materials employed for the above may be obtained in the following manner. 20,21-oxidopregna-4,16-dien-3-one is treated with hydrogen fluoride and then acetic anhydride in the manner described by Magerlein et al., J. Med. Chem. 7, 748 (1964) to yield 16α-fluoro-21-acetoxypregna-4,17(20)-diene-3-one or with hydrogen chloride and then acetic acid in the manner of Kagan et al., J. Med. Chem. 7, 751 (1964) to yield 16α-chloro-21-acetoxypregna-4,17(20)-diene-3-one. Each of these compounds is then oxidized with osmium tetroxide and N-methylmorpholine oxide-hydrogen peroxide, as described in both of these references, to yield 16α-fluoro-21-acetoxypregn-4-en-17α-3,20-dione and 16α-chloro-21-acetoxypregn-4-en-17α-ol-3,20-dione, which are hydrolyzed with base to yield the free 21-hydroxy compounds which can be removed as described above.

What is claimed is:
1. The compound according to the formula:

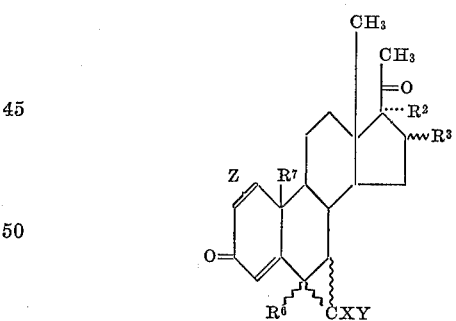

wherein:
R² is hydrogen, hydroxy or a hydrocarbon carboxylic acyloxy group of less than 12 carbon atoms;
R³ is methylene, β-methyl, α-chloro, α-fluoro, α-hydroxy, or an α-hydrocarbon carboxylic acyloxy group of less than 12 carbon atoms;
R⁶ is hydrogen, methyl, chloro or fluoro;
R⁷ is hydrogen or methyl;
Z is a carbon-carbon single bond or a carbon-carbon double bond, Z being a single bond when R⁷ is hydrogen; and
each of X and Y is hydrogen, chloro or fluoro.
2. The compound claimed in claim 1 wherein R³ is methylene or β-methyl.
3. The compound claimed 2 wherein each of X and Y is fluoro.
4. The compound claimed in claim 3 wherein R³ is methylene, R⁶ is chloro or fluoro and R⁷ is methyl.
5. The compound claimed in claim 4 wherein R² is hydroxy, R⁶ is chloro and Z is a carbon-carbon single bond.

6. The compound claimed in claim 4 wherein $R^2$ is acetoxy, $R^6$ is chloro and Z is a carbon-carbon single bond.

7. The compound claimed in claim 4 wherein $R^2$ is hydroxy, $R^3$ is fluoro and Z is a carbon-carbon single bond.

8. The compound claimed in claim 4 wherein $R^2$ is acetoxy, $R^6$ is fluoro and Z is a carbon-carbon single bond.

9. The compound claimed in claim 4 wherein $R^2$ is hydroxy, $R^6$ is chloro and Z is a carbon-carbon double bond.

10. The compound claimed in claim 4 wherein $R^2$ is acetoxy, $R^6$ is chloro and Z is a carbon-carbon double bond.

11. The compound claimed in claim 4 wherein $R^2$ is hydroxy, $R^6$ is fluoro and Z is a carbon-carbon double bond.

12. The compound claimed in claim 4 wherein $R^2$ is acetoxy, $R^6$ is fluoro and Z is a carbon-carbon double bond.

13. The compound according to the formula:

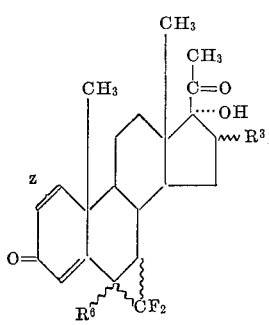

wherein:

$R^3$ is methylene or $\beta$-methyl;
$R^6$ is hydrogen, methyl, chloro or fluoro; and
Z is a carbon-carbon single bond or a carbon-carbon double bond;

and the 17-acetate derivative thereof.

14. The compound claimed in claim 13 wherein $R^6$ is chloro or fluoro.

15. The compound according to the formula:

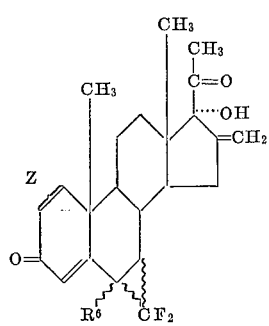

wherein:

$R^6$ is chloro or fluoro and Z is a carbon-carbon single bond or a carbon-carbon double bond;

and the 17-acetate derivative thereof.

16. The compound according to claim 1 of the formula

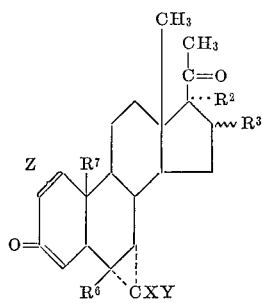

wherein:

$R^2$ is hydrogen, hydroxy, or a hydrocarbon carboxylic acyloxy group of less than 12 carbon atoms;
$R^3$ is methylene, $\beta$-methyl-$\alpha$-chloro, $\alpha$-fluoro, $\alpha$-hydroxy, or an $\alpha$-hydrocarbon carboxylic acyloxy group of less than 12 carbon atoms;
$R^6$ is hydrogen, methyl, chloro or fluoro;
$R^7$ is hydrogen or methyl;
Z is a carbon-carbon single bond or a carbon-carbon double bond, Z being a single bond when $R^7$ is hydrogen;
and each of X and Y is hydrogen, chloro or fluoro.

17. The compound according to claim 16 wherein $R^3$ is methylene, $R^6$ is chloro or fluoro, $R^7$ is methyl, and each of X and Y is fluoro.

18. The compound according to claim 17 wherein $R^2$ is hydroxy, $R^6$ is fluoro, and Z is a carbon-carbon single bond.

19. The compound according to claim 17 wherein $R^2$ is acetoxy, $R^6$ is fluoro, and Z is a carbon-carbon single bond.

20. The compound according to claim 17 wherein $R^2$ is hydroxy, $R^6$ is fluoro, and Z is a carbon-carbon double bond.

21. The compound according to claim 17 wherein $R^2$ is acetoxy, $R^6$ is fluoro, and Z is a carbon-carbon double bond.

22. The compound according to the formula:

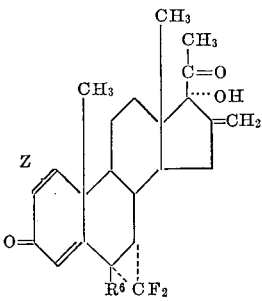

wherein $R^6$ is chloro or fluoro and Z is a carbon-carbon single bond or a carbon-carbon double bond; and the 17-acetate derivative thereof.

23. The compound according to claim 22 wherein $R^6$ is fluoro and Z is a carbon-carbon double bond.

References Cited

UNITED STATES PATENTS

| | | | |
|---|---|---|---|
| 3,047,566 | 7/1962 | Godtfredsen et al. | 260—239.55 |
| 3,200,113 | 8/1965 | Christiansen et al. | 260—239.5 |
| 3,243,434 | 3/1966 | Krakower | 260—239.55 |

HENRY A. FRENCH, Primary Examiner

U.S. Cl. X.R.

260—239.55, 397.3, 999